United States Patent
Pylkki et al.

(10) Patent No.: US 7,426,804 B2
(45) Date of Patent: *Sep. 23, 2008

(54) SPECIALTY DISPLAY WINDOW

(75) Inventors: Russell John Pylkki, Saint Paul, MN (US); James Brian Libby, Stillwater, MN (US); Kurt E. Heikkila, Marine on the St. Croix, MN (US)

(73) Assignee: Andersen Corporation, Bayport, MN (US)

( * ) Notice: Subject to any disclaimer, the term of this patent is extended or adjusted under 35 U.S.C. 154(b) by 637 days.

This patent is subject to a terminal disclaimer.

(21) Appl. No.: 10/068,070

(22) Filed: Feb. 6, 2002

(65) Prior Publication Data

US 2003/0145536 A1    Aug. 7, 2003

(51) Int. Cl.
*E04D 13/18* (2006.01)

(52) U.S. Cl. ................... 52/173.3; 52/204.5; 52/204.59; 52/208; 81/388; 353/70; 353/79; 353/119; 359/444; 359/445; 362/86; 362/87

(58) Field of Classification Search ............... 52/204.1, 52/204.71, 786.1, 800.12, 171.3, 52, 173.3, 52/204.5, 706.1, 204.59, 208, 32; 349/16, 349/96, 98, 228; 359/228, 443, 444–445; 160/10; 340/546, 545.8; 178/18.04, 19.02; 353/79, 70, 119, 88, 98; 315/169.3; 250/221; 345/175, 46; 81/388; 362/86.87; 381/152, 381/333, 425, 345

See application file for complete search history.

(56) References Cited

U.S. PATENT DOCUMENTS

| | | | |
|---|---|---|---|
| 1,778,084 A | 10/1930 | Nevin | |
| 2,439,553 A * | 4/1948 | Winn | 359/228 |
| 3,943,282 A | 3/1976 | Muntz | |
| 4,058,837 A | 11/1977 | Muntz | |
| 4,093,352 A * | 6/1978 | Pisar | 359/886 |
| 4,231,067 A | 10/1980 | Jewell et al. | |
| 4,281,488 A | 8/1981 | Resibois | |
| 4,400,723 A | 8/1983 | Fanizza et al. | |
| 4,899,503 A * | 2/1990 | Baughman et al. | 52/171.3 |
| 4,926,486 A | 5/1990 | Barsumian | |

(Continued)

FOREIGN PATENT DOCUMENTS

DE    201 13 157 U1    1/2002

(Continued)

OTHER PUBLICATIONS

"NXT, Technology Review, Jan. 2002," http://www.nxtsound.com/nxtsound/technology/techrev/index.asp, 33 pgs. (date printed: Feb. 7, 2003).

(Continued)

*Primary Examiner*—Jeanette Chapman
(74) *Attorney, Agent, or Firm*—Womble Carlyle Sandridge & Rice, PLLC

(57) ABSTRACT

A window unit includes a window frame defining a frame perimeter and a window located within the frame perimeter. The window includes a display surface adapted to receive a display image. A display image source is disposed in the window frame and a speaker element is disposed in the window. The window can transform from a first transparent state to a second increased opacity state for receiving the display image on the display surface.

20 Claims, 4 Drawing Sheets

U.S. PATENT DOCUMENTS

| | | | |
|---|---|---|---|
| 4,964,251 A * | 10/1990 | Baughman et al. | 52/171.3 |
| 5,007,707 A | 4/1991 | Bertagni | |
| 5,009,044 A * | 4/1991 | Baughman et al. | 52/171.3 |
| 5,025,602 A * | 6/1991 | Baughman et al. | 52/171.3 |
| 5,111,629 A * | 5/1992 | Baughman et al. | 52/171.3 |
| 5,400,414 A | 3/1995 | Thiele | |
| 5,686,979 A * | 11/1997 | Weber et al. | 349/96 |
| 5,793,877 A | 8/1998 | Tagg | |
| 6,072,489 A * | 6/2000 | Gough et al. | 715/803 |
| 6,100,538 A * | 8/2000 | Ogawa | 250/559.29 |
| 6,144,417 A * | 11/2000 | Yanagisawa | 348/823 |
| 6,151,402 A | 11/2000 | Azima et al. | |
| 6,192,136 B1 | 2/2001 | Azima et al. | |
| 6,215,881 B1 * | 4/2001 | Azima et al. | 381/152 |
| 6,239,898 B1 * | 5/2001 | Byker et al. | 359/265 |
| 6,332,029 B1 | 12/2001 | Azima et al. | |
| 6,369,943 B1 | 4/2002 | Bachmann et al. | |
| 6,389,935 B1 | 5/2002 | Azima et al. | |
| 6,394,609 B1 | 5/2002 | Rodriguez, Jr. et al. | |
| 6,394,610 B2 | 5/2002 | Rodriguez, Jr. | |
| 6,397,972 B1 | 6/2002 | Bank et al. | |
| 6,399,870 B1 | 6/2002 | Azima et al. | |
| 6,443,586 B1 | 9/2002 | Azima et al. | |
| 6,456,723 B1 | 9/2002 | Bank et al. | |
| 6,557,611 B1 * | 5/2003 | Fuentes | 160/10 |
| 6,572,232 B2 | 6/2003 | Yaniv | |
| 6,577,355 B1 | 6/2003 | Yaniv | |
| 6,588,909 B2 | 7/2003 | Yaniv et al. | |
| 6,594,065 B2 * | 7/2003 | Byker et al. | 359/265 |
| 6,616,284 B2 | 9/2003 | Yaniv et al. | |
| 6,680,579 B2 * | 1/2004 | Allen et al. | 315/169.3 |
| 6,717,073 B2 * | 4/2004 | Xu et al. | 178/18.04 |
| 6,726,335 B2 * | 4/2004 | Yaniv et al. | 353/98 |
| 6,838,657 B2 * | 1/2005 | Iwamoto et al. | 250/221 |
| 2002/0114483 A1 | 8/2002 | Azima et al. | |
| 2003/0174295 A1 | 9/2003 | Yaniv et al. | |
| 2003/0233794 A1 * | 12/2003 | Pylkki et al. | 52/173.1 |

FOREIGN PATENT DOCUMENTS

| | | |
|---|---|---|
| FR | 2 434 540 | 4/1980 |
| GB | 2 351 200 A | 12/2000 |
| JP | 11072843 A | 3/1999 |
| WO | WO 97/09842 | 3/1997 |
| WO | WO 99/37121 | 7/1999 |
| WO | WO 00/02417 | 1/2000 |
| WO | WO 00/35242 | 6/2000 |
| WO | WO 00/60407 | 10/2000 |
| WO | WO 01/03467 A2 | 1/2001 |
| WO | WO 01/05189 A2 | 1/2001 |
| WO | WO 01/10168 A2 | 2/2001 |

OTHER PUBLICATIONS

"Billboard Vision", 3 pages, date unknown.

"Glas Platz All-Glass Loudspeakers. Elegant All-Glass Loudspeakers from Glass Platz are the Ultimate Showcase of NXT's Surfacesound™ Technology", http://www.dba-pr.com/clients/nxt_plc/releases/glassplatz.htm, 2 pages, date printed Jan. 24, 2002.

"Glas Platz, Wiehl-Bomig—Expo 2000", http://www.glas-platz.de/_refsmhouse.htm, 2 pages, date printed Jan. 24, 2002.

"Smart-house.net 'future living for today'. Heart of Glass", http://www.smart-house.net/monthly_features/sept01-2.shtml, 3 pages (Sep. 2001).

"Switchable Privacy Glass. AGP 'UMU' Privacy at the Flick of a Switch", Architectural Glass Projects Pty Limited, 6 pages, date printed.

\* cited by examiner

SPECIALTY DISPLAY WINDOW

BACKGROUND OF THE INVENTION

The invention generally relates to fenestration units, such as windows or patio doors, that provide a display surface for projecting images thereon and also provide a speaker element.

SUMMARY OF THE INVENTION

In accordance with the present invention, there is provided a fenestration unit, such as a window unit that includes a window frame defining a frame perimeter and a window located within the frame perimeter. The window includes a display surface adapted to receive a display image. A display image source is disposed in the window frame and a speaker element is disposed in the window. The window can transform from a first transparent state to a second increased opacity state for receiving the display image on the display surface.

Also in accordance with the present invention, there is provided a method that includes constructing a window unit by providing a window frame defining a frame perimeter and providing a window within the frame perimeter. The window includes a display surface adapted to receive a display image. A display image source a can be disposed on the window frame and a speaker element can be disposed in the window. The window can transform from a first transparent state to a second increased opacity state for receiving the display image on the display surface.

DETAILED DESCRIPTION

Figure 1:
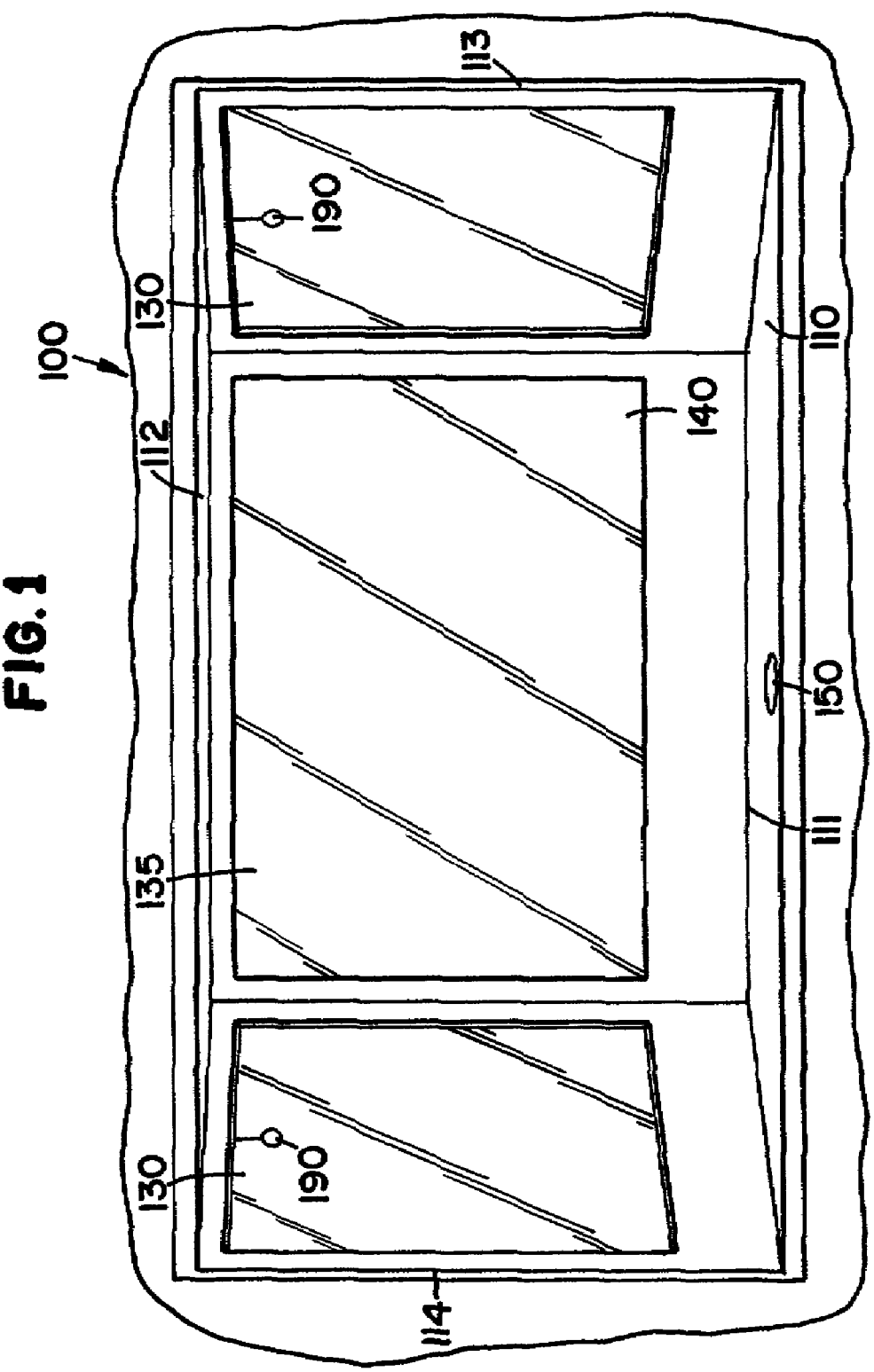
FIG. 1 is a perspective view of a window unit in accordance with the invention.

The present invention is applicable to many different types of fenestration units, such as windows or patio doors, which include a glazing unit such as glass. For simplicity, the invention will be described mostly in the context of a window, although patio door and other fenestration units may be used with the present invention. FIG. 1 illustrates one particular embodiment of a window unit in accordance with the invention. The window unit 100 includes a window frame 110. The window frame 110 defines a window frame perimeter 120. A window 130, 135 is located within the frame perimeter 120. The window frame 110 may include a sash frame, a casement frame or a frame of any window or patio door type or combination. The window frame 110 may include a frame surrounding window glass, a sash frame, a casement frame, or a frame of any window or patio door type or combination.

The window unit 100 illustrated in FIG. 1 is a bay window having a plurality of windows, including, a main display window 135 between two side windows 130. However, the window unit 100 may, for example, be capable of being opened or closed. The window 100 may be, for example, a picture window, a bay window, bow window, projection window, a double-hung window, a skylight, egress window, an awning window, a casement window, a gliding window, and the like.

The window frame 110 may include two pair of opposed frame members. A first pair of opposed frame members includes a bottom frame member 111 and a top frame member 112 and can be oriented along a horizontal rigid frame axis. A second pair of opposed rigid frame members includes a first side frame member 113 and a second side frame member 114 can be oriented along a vertical frame axis. The four frame members 111, 112, 113, 114 can generally form a square or rectangle shape. However, the window frame may be any shape.

The window 135 includes a display surface 140 adapted to receive a display image. The main display window 135 and the two side windows 130 can transform from a first transparent state to a second increased opacity state for receiving the display image on the display surface 140. Any means of increasing the opacity of transparent materials may be used such as, for example, polymer dispersed liquid crystal technology. Opacity is the relative capacity of matter to obstruct the transmission of radiant energy or light.

Polymer dispersed liquid crystals may be sandwiched between two pieces of conducting glass. The conducting glass may be a portion of, or the entire window 130, 135. Polymer dispersed liquid crystals operate on the principle of electrically controlled light scattering. When electricity is not applied to the window 130, 135, the liquid crystal droplets are randomly orientated, creating an increased opacity state. When electricity is applied, the liquid crystal droplets align parallel to the electric field and light passes through, creating a more transparent state.

The window unit may include a display image source 150 disposed in the window frame 110. The display image source 150 can be located in the top frame member 112, the bottom frame member 111, the first side frame member 113 or the second side frame member 114. Alternatively, more than one display image source 150 can be located in the window frame 110 and be located in one or more frame member 111, 112, 113, 114. The display image source 150 may be, for example, a projector.

The display image source may project an image on the display surface 140 of the window 135. If the window unit 100 is installed in a structure, the display surface 140 of the window 135 may be an interior window surface for viewing images within the structure or the display surface 140 of the window 135 may be an exterior window surface for viewing images outside the structure.

The display image source 150 may be a heads-up display that projects onto the display surface 140 from below the window frame 110.

The window unit 100 may also include a speaker element 190. The speaker element 190 may be disposed in one or more of the windows 130, 135. The speaker element 190 can be disposed in the main display window 135, one or both side windows 130 or in both the main display window 135 and both side windows 130. The speaker element 190 can produce sound in response to an audio signal. The audio signal may be an analog signal, a digital signal or an analog and digital signal, and the like. The speaker element 190 can be located on or in the window 130, 135. The speaker element 190 may operate in cooperation with the display image source 150 to provide sound to accompany the display images.

Figure 2:
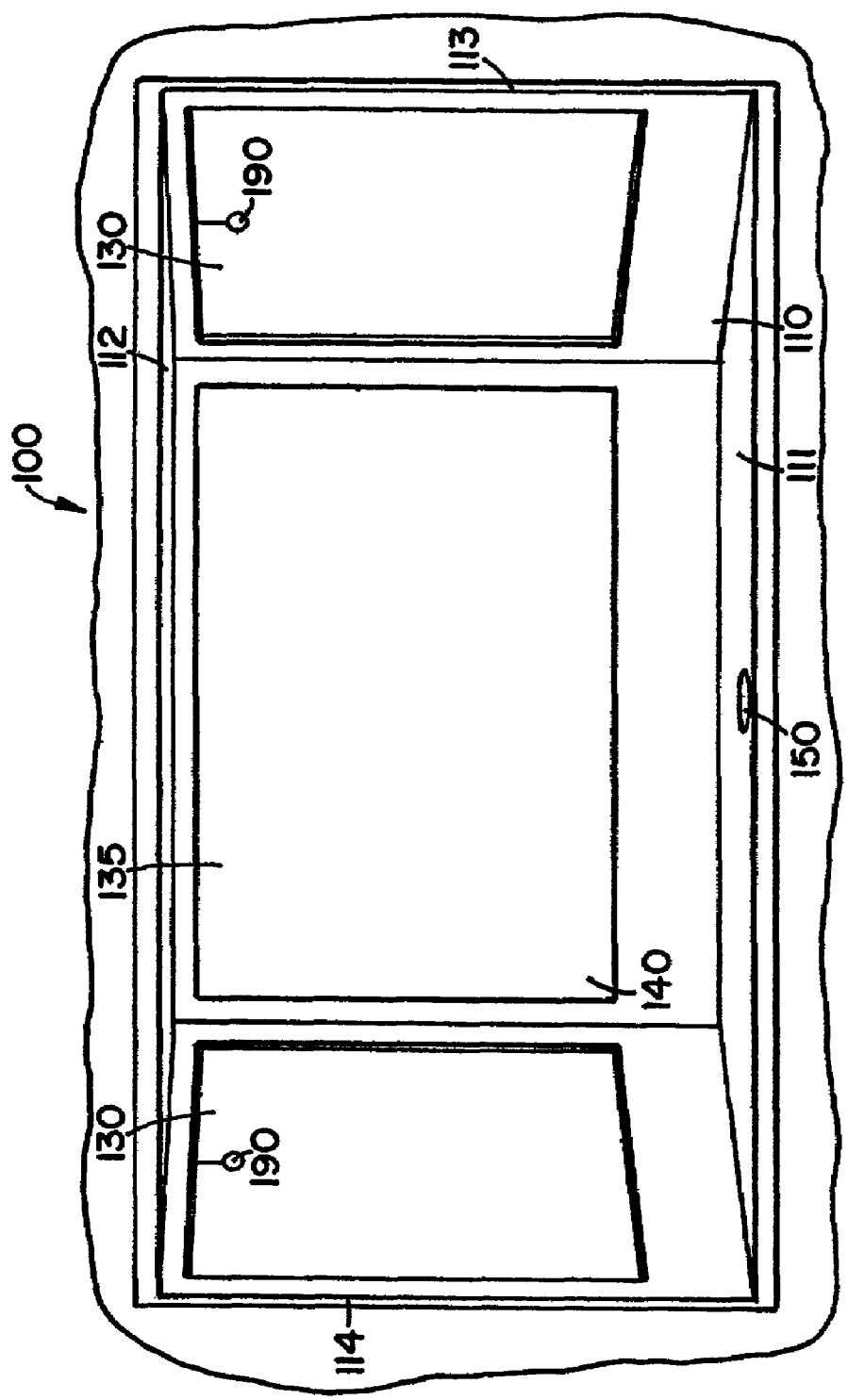
FIG. 2 is a perspective view of the window unit shown in FIG. 1 with increased opacity windows.

FIG. 2 is a perspective view of the window unit shown in FIG. 1 with increased opacity windows 130, 135. The main display window 135 and the two side windows 130 may be operated independent of each other. The main display window 135 opacity can be increased while leaving one or both side windows 130 transparent. Alternatively, one or both side windows 130 opacity can be increased while leaving the main display window 135 transparent.

Figure 3:
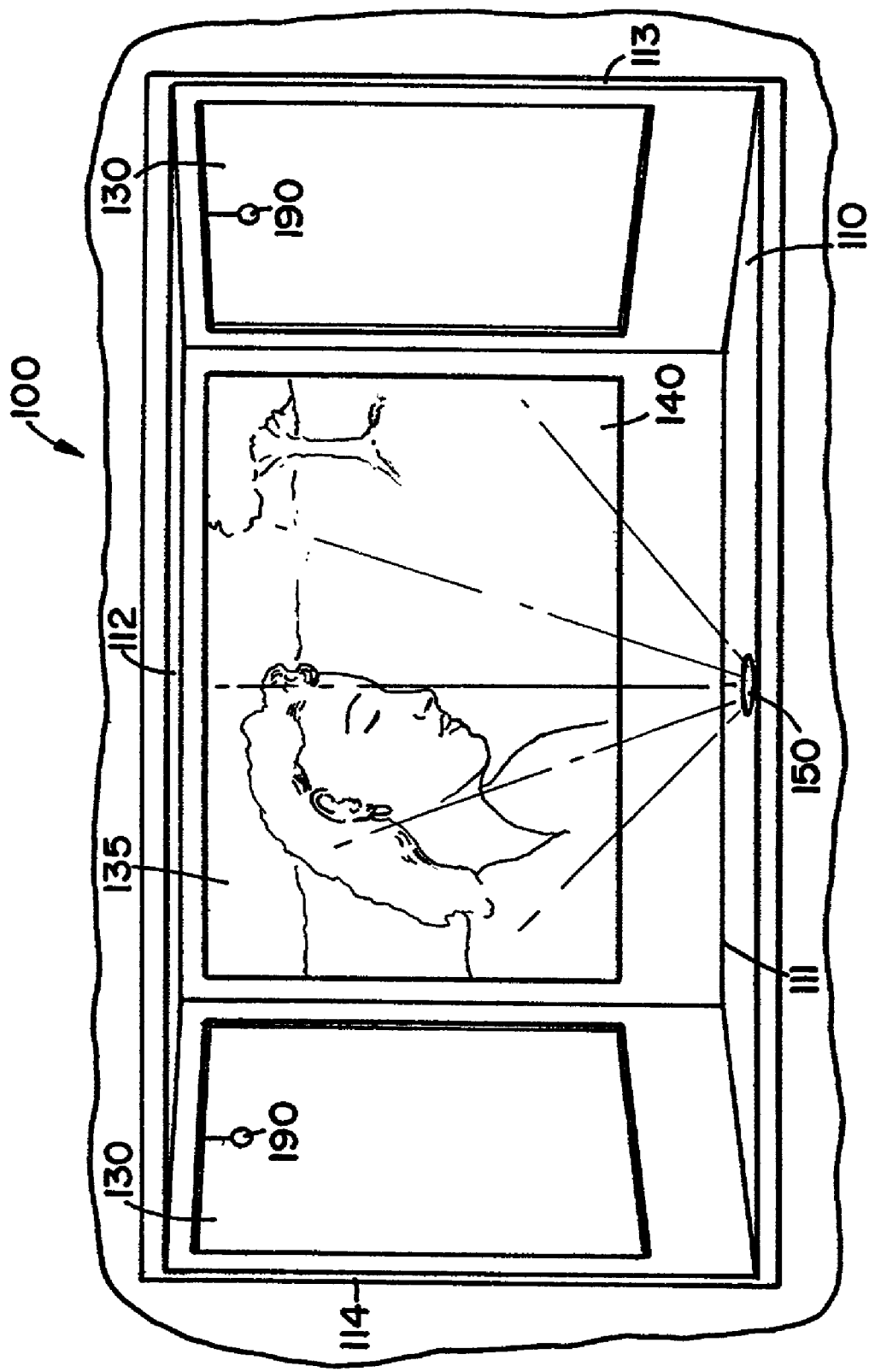
FIG. 3 is a perspective view of the window unit shown in FIG. 2 with an image projected on the increased opacity window.

FIG. 3 is a perspective view of the window unit shown in FIG. 2 with an image projected on the increased opacity window 135.

Figure 4:
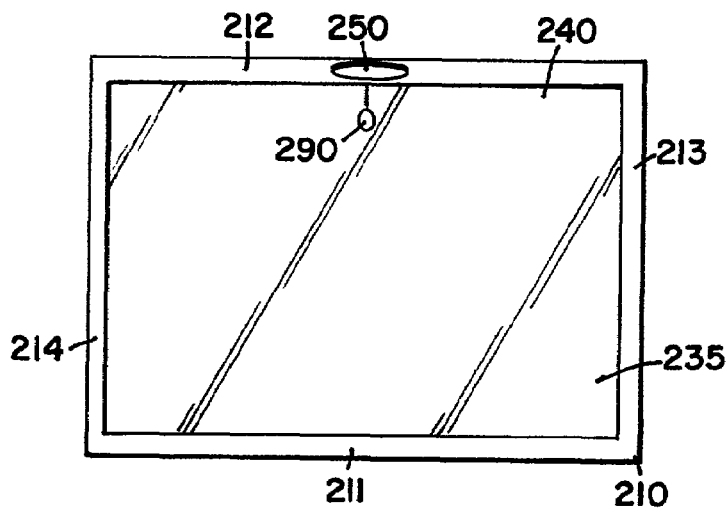
FIG. 4 is a perspective view of a window unit in accordance with an alternative embodiment of the invention.

FIG. 4 is a perspective view of a window unit in accordance with an alternative embodiment of the invention. The window unit 200 includes a window frame 210. The window frame 210 defines a window frame perimeter 220. A glazing unit 235 is located within the frame perimeter 220. The window frame 210 may include a sash frame, a casement frame or a frame surrounding window glass or sash frame or casement frame. The window unit 200 illustrated in FIG. 4 is a single picture window having a main display area on a glazing unit 235.

The window frame 210 may include two pair of opposed frame members. A first pair of opposed frame members includes a bottom frame member 211 and a top frame member 212 and can be oriented along a horizontal rigid frame axis. A second pair of opposed rigid frame members includes a first side frame member 213 and a second side frame member 214 can be oriented along a vertical frame axis. The four frame members 211, 212, 213, 214 can generally form a square or rectangle shape. However, the window frame may be any shape.

The window 235 includes a display surface 240 adapted to receive a display image. The main display window or glazing unit 235 can transform from a first transparent state to a second increased opacity state for receiving the display image on the display surface 240. Any means of increasing the opacity of transparent materials may be used such as, for example, polymer dispersed liquid crystal technology as described above. A transparent state means that a significant percentage of visible light can pass through an object. Preferably, a large percentage of visible light can pass through an object in a transparent state.

The window unit may include a display image source 250 disposed in the window frame 210. The display image source 250 can be located in the top frame member 212, the bottom frame member 211, the first side frame member 213 or the second side frame member 214. Alternatively, more than one display image source 250 can be located in the window frame 210 and be located in one or more frame member 211, 212, 213, 214. The display image source 250 may be, for example, a projector.

The display image source 250 may project an image on the display surface 240 of the window 235. If the window unit 200 is installed in a structure, the display surface 240 of the window 235 may be an interior window surface for viewing images within the structure or the display surface 240 of the window 235 may be an exterior window surface for viewing images outside the structure.

The window unit 200 may also include a speaker element 290. The speaker element 290 may be disposed in the window 235. The speaker element 290 can produce sound in response to an audio signal. The audio signal may be an analog signal, a digital signal or an analog and digital signal, and the like. The speaker element 290 can be located on or in the window 235. The speaker element 290 may operate in cooperation with the display image source 250 to provide sound for the display images.

Figure 5:
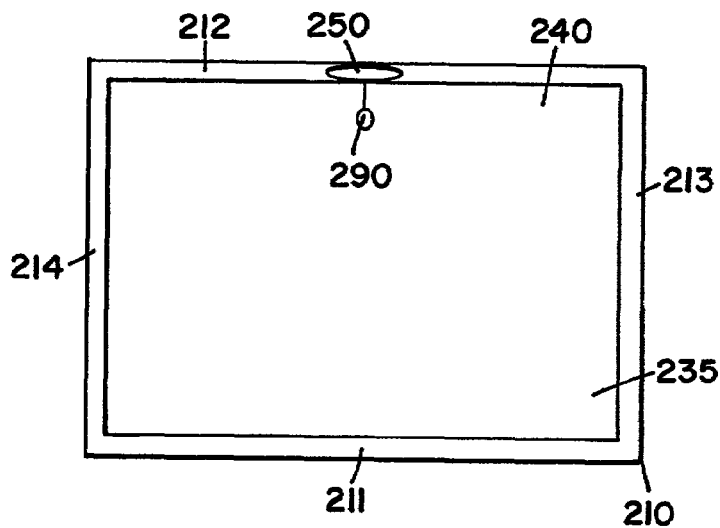
FIG. 5 is a perspective view of the window unit shown in FIG. 4 with an increased opacity window.

FIG. 5 is a perspective view of the window unit shown in FIG. 4 with an increased opacity window 135.

Figure 6:
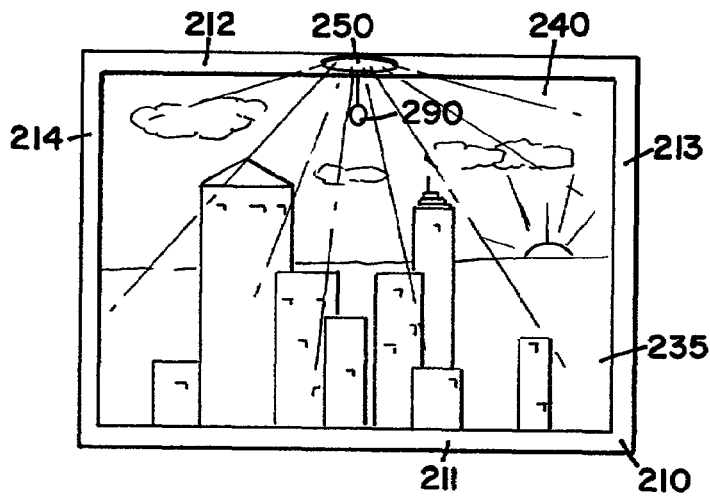
FIG. 6 is a perspective view of the window unit shown in FIG. 5 with an image projected on the increased opacity window.

FIG. 6 is a perspective view of the window unit shown in FIG. 5 with an image projected on the increased opacity window 135.

A window unit can be constructed by providing a window frame defining a frame perimeter and providing a window within the frame perimeter. The window includes a display surface adapted to receive a display image. A display image source a can be disposed on the window frame and a speaker element can be disposed in the window, or the audio or speaker element can be used separately. The window can transform from a first transparent state to a second increased opacity state for receiving the display image on the display surface.

Alternatively, embodiments similar to the embodiments shown in FIGS. 1-6 may be constructed using a patio door unit. A patio door unit may include one or two doors. The doors may open by sliding or on a hinge. A patio door unit may also include a stationary component including a glazing unit. One or more of the glazing units in the patio door may be capable of switching from a transparent state to an increased opacity state. A display image source may be provided in the door frame, the door unit frame or otherwise proximate to the door unit to project an image onto some portion of a glazing unit or units. For example, a patio door unit may include two door and the display image source may project on only the glazing unit or window of only one door, may project one image on the glazing units of both doors, or may project two different images onto the glazing units of the two doors. In addition, one, two, or more speaker elements may be disposed in one or more of the windows or glazing units of the patio unit.

We claim:

1. A window unit comprising:
   (a) a window frame defining a frame perimeter; and
   (b) a window located within the frame perimeter, the window includes a display surface adapted to receive a display image;
   (c) a display image source disposed in the window frame; and
   (d) a speaker element disposed in the window unit;
   wherein, the window can transform from a first transparent state to a second increased opacity state for receiving the display image on the display surface.

2. The window unit of claim 1 wherein, the window unit comprises a single window.

3. The window unit of claim 1 wherein, the window unit comprises a plurality of windows.

4. The window of claim 2 wherein, the window unit is a picture window.

5. The window of claim 3 wherein, the window unit is a bay window including a main display window between two side windows.

6. The window of claim 5 wherein, the speaker element is disposed in a side window.

7. The window of claim 5 wherein, the speaker element is disposed in each side window.

8. The window of claim 5 wherein, the speaker element is disposed in the main display window.

9. The window of claim 5 wherein, the speaker element is disposed in each side window and main display window.

10. The window of claim 1 wherein, the window frame includes a first pair of opposed frame members, which includes a bottom frame member and a top frame member oriented along a horizontal rigid frame axis and a second pair of opposed rigid frame members, which includes a first side frame member and a second side frame member can be oriented along a vertical frame axis, the display image source disposed in the bottom frame member, top frame member, first side member, or second side member.

11. The window of claim 10 wherein, the display image source is disposed in the bottom frame member.

12. The window of claim 10 wherein, the display image source is disposed in the top frame member.

13. The window of claim 10 wherein, further comprising a second display image source disposed in the bottom frame member, top frame member, first side member, or second side member.

14. A method comprising:
    (a) providing a window frame defining a frame perimeter;
    (b) providing a window within the frame perimeter, the window includes a display surface adapted to receive a display image;
    (c) disposing a display image source in the window frame; and
    (d) disposing a speaker element in the window frame;
wherein, the window can transform from a first transparent state to a second increased opacity state for receiving the display image on the display surface.

15. A patio door unit comprising:
    (a) a patio door frame defining a frame perimeter; and
    (b) a patio door window located within the frame perimeter, the patio door window includes a display surface adapted to receive a display image;
    (c) a display image source disposed in the patio door frame; and
    (d) a speaker element disposed in the patio door unit;
wherein, the patio door window can transform from a first transparent state to a second increased opacity state for receiving the display image on the display surface.

16. The patio door unit of claim 15 wherein, the patio door unit comprises a single patio door.

17. The patio door unit of claim 15 wherein, the patio door unit comprises a plurality of patio door windows.

18. The patio door of claim 15 wherein, the patio door frame includes a first pair of opposed frame members, which includes a bottom frame member and a top frame member oriented along a horizontal rigid frame axis and a second pair of opposed rigid frame members, which includes a first side frame member and a second side frame member can be oriented along a vertical frame axis, the display image source disposed in the bottom frame member, top frame member, first side member, or second side member.

19. The patio door of claim 18 wherein, the display image source is disposed in the bottom frame member.

20. The patio door of claim 18 wherein, the display image source is disposed in the top frame member.

* * * * *